United States Patent
Takada

(10) Patent No.: US 8,568,120 B2
(45) Date of Patent: Oct. 29, 2013

(54) TIRE VULCANIZATION MOLD MANUFACTURING METHOD AND TIRE VULCANIZATION MOLD

(75) Inventor: Noboru Takada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/391,537

(22) PCT Filed: Jul. 29, 2010

(86) PCT No.: PCT/JP2010/062772
§ 371 (c)(1),
(2), (4) Date: Feb. 21, 2012

(87) PCT Pub. No.: WO2011/024594
PCT Pub. Date: Mar. 3, 2011

(65) Prior Publication Data
US 2012/0148696 A1    Jun. 14, 2012

(30) Foreign Application Priority Data
Aug. 26, 2009   (JP) .................................. 2009-195894

(51) Int. Cl.
*B29C 33/10*   (2006.01)
*B22D 19/00*   (2006.01)

(52) U.S. Cl.
USPC .................. 425/28.1; 164/9; 164/10; 164/11; 164/112; 425/812

(58) Field of Classification Search
USPC ............ 425/28.1, 35, 812; 164/9, 10, 11, 98, 164/108, 112, 236, 332, 333, 334
See application file for complete search history.

(56) References Cited

U.S. PATENT DOCUMENTS

| 4,023,268 A * | 5/1977 | Momchilov ................. 425/28.1 |
| 5,866,171 A * | 2/1999 | Kata ............................. 425/28.1 |
| 7,384,252 B2 * | 6/2008 | Iwamoto et al. ............. 425/28.1 |
| 7,874,821 B2 * | 1/2011 | Ohara ........................... 425/28.1 |
| 2010/0092590 A1 | 4/2010 | Ohara |

FOREIGN PATENT DOCUMENTS

| JP | 02-014109 A | 1/1990 |
| JP | 04-338512 A | 11/1992 |
| JP | 5-138656 | * 6/1993 |

(Continued)

OTHER PUBLICATIONS

International Search Report of corresponding International Application No. PCT/JP2010/062772, dated on Sep. 21, 2010.

*Primary Examiner* — James Mackey
(74) *Attorney, Agent, or Firm* — Global IP Counselors, LLP

(57) ABSTRACT

A tire vulcanization mold manufacturing method can manufacture a tire vulcanization mold having an exhaust mechanism capable of ensuring sufficient exhaust with fewer processing steps. When a mold having a surface of a gypsum mold transferred to the mold is to be manufactured by pouring molten metal onto the surface of the gypsum mold and solidifying the molten metal, a tubular body having a slit allowing hollow inside to communicate with the outside is disposed in such a way that the slit is brought into contact with the surface of the gypsum mold. Thereafter, the molten metal is poured onto the surface of the gypsum mold in such a way that the tubular body is buried in the mold while the slit is exposed on a tire molding surface of the mold.

21 Claims, 6 Drawing Sheets

(56) References Cited

FOREIGN PATENT DOCUMENTS

| JP | 08-141699 A | 6/1996 |
| JP | 08-323771 A | 12/1996 |
| JP | 11-300746 A | 11/1999 |
| JP | 2000-102926 * | 4/2000 |
| JP | 2001-232641 A | 8/2001 |
| JP | 3541261 B2 | 4/2004 |
| JP | 2004-181664 * | 7/2004 |
| JP | 2006-334922 A | 12/2006 |
| JP | 2008-260135 A | 10/2008 |

* cited by examiner

TIRE VULCANIZATION MOLD MANUFACTURING METHOD AND TIRE VULCANIZATION MOLD

CROSS-REFERENCE TO RELATED APPLICATIONS

This U.S. National stage application claims priority under 35 U.S.C. §119(a) to Japanese Patent Application No. 2009-195894, filed in Japan on Aug. 26, 2009, the entire contents of Japanese Patent Application No. 2009-195894 are hereby incorporated herein by reference.

BACKGROUND

Field of the Invention

The present invention relates to a tire vulcanization mold manufacturing method and a tire vulcanization mold. To be more specific, the present invention relates to a tire vulcanization mold manufacturing method and a tire vulcanization mold by which an exhaust mechanism capable of ensuring sufficient exhaust can be formed in fewer processing steps.

Background Information

A tire vulcanization mold is provided with an exhaust mechanism configured to exhaust, to the outside of the mold, gas generated during the vulcanization and air remaining between a green tire and the mold. Conventionally, vent holes have been used as the exhaust mechanism in many molds. However, in the vulcanization, rubber enters the vent holes and produces spews. In this respect, various proposals have been made of exhaust mechanisms that produce no spews, such as those described, for example, in Japanese Patent Application Kokai Publication No. Hei 4-338512, Japanese Patent No. 3541261 and Japanese Patent Application Kokai Publication No. 2008-260135.

Japanese Patent Application Kokai Publication No. Hei 4-338512 and Japanese Patent No. 3541261 each propose an exhaust mechanism in which a laminated blade formed by stacking thin plates on one another is extended to end surfaces of a mold and is buried in the mold. Air and gas are exhausted to the outside of the mold through a minute gap between the thin plates of the laminated blade. This exhaust mechanism has a long length of the minute gap, through which air and gas passes to be exhausted to the outside of the mold, in the laminated blade. Thus, there is a problem that it is difficult to ensure sufficient exhaust.

In this respect, Japanese Patent Application Kokai Publication No. 2008-260135 proposes an exhaust mechanism using a laminated blade as follows for ensuring a sufficient exhaust. The laminated blade is obtained by folding a thin plate such that end portions of the thin plate overlap each other on one end side of the laminated blade and a large gap is secured on the other end side of the laminated blade. The laminated blade is held by a block, and the block is fitted into a recessed pocket in a tire molding surface of a mold. Thus, an exhaust chamber surrounded by the pocket and the block is formed. Air and gas are exhausted to the exhaust chamber through a minute gap in the one end portion of the laminated blade and the large gap in the other end portion thereof.

However, manufacturing this exhaust mechanism requires a step of forming the pocket in the tire molding surface of the cast mold, a step of manufacturing an assembly in which the laminated blade is held by the block, and a step of fitting the assembly into the pocket. Thus there is a problem that manufacturing the exhaust mechanism requires many processing steps and thus a long time.

SUMMARY OF THE INVENTION

An object of the present invention is to provide a tire vulcanization mold manufacturing method and a tire vulcanization mold by which an exhaust mechanism capable of ensuring sufficient exhaust can be formed with fewer processing steps.

In order to achieve the above object, a tire vulcanization mold manufacturing method of the present invention is a tire vulcanization mold manufacturing method of manufacturing a mold on which a surface of a gypsum mold is transferred thereto, the tire vulcanization mold manufacturing method comprising: pouring molten metal onto the surface of the gypsum mold; and solidifying the molten metal, wherein a tubular body having a slit through which an hollow inside of the tubular body communicates with an outside is disposed in such a way that the slit is brought into contact with the surface of the gypsum mold, and the molten metal is poured thereafter onto the surface of the gypsum mold in such a way that the tubular body is buried in the mold while the slit is exposed on a tire molding surface of the mold.

Here, tubular body holding members each provided with a groove may be disposed respectively in opposite end portions of the gypsum mold, and the tubular body may be fitted to the grooves to be disposed in such a way that the slit is brought into contact with the surface of the gypsum mold. The tubular body having the hollow inside thereof previously filled with an easily-collapsible fire-resistant material is disposed in such a way that the slit is brought into contact with the surface of the gypsum mold, and the easily-collapsible fire-resistant material is removed from the hollow inside of the tubular body after the molten metal is solidified.

Another tire vulcanization mold manufacturing method of the present invention is a tire vulcanization mold manufacturing method of manufacturing a mold having a surface of a gypsum mold transferred thereto, the tire vulcanization mold manufacturing method comprising: pouring molten metal onto a surface of a gypsum mold; and solidifying the molten metal, wherein a tubular body having a hollow inside is disposed in such a way that an outer peripheral surface of the tubular body is brought into contact with the surface of the gypsum mold, thereafter the molten metal is poured onto the surface of the gypsum mold in such a way that the tubular body is buried in the mold while a portion of the outer peripheral surface of the tubular body is exposed on a tire molding surface of the mold, and a slit is formed in the exposed portion of the outer peripheral surface of the tubular body by laser processing.

Here, tubular body holding members each provided with a groove may be disposed respectively in opposite end portions of the gypsum mold and the tubular body may be fitted to the grooves to be disposed in such a way that the outer peripheral surface thereof is brought into contact with the surface of the gypsum mold.

A tire vulcanization mold of the present invention is a tire vulcanization mold formed by solidifying molten metal, the tire vulcanization mold comprising a tubular body buried in the mold in the solidification of the molten metal, wherein a slit formed in an outer peripheral surface of the tubular body is exposed on a tire molding surface of the mold.

In the tire vulcanization mold manufacturing method of the present invention, the tubular body having the slit allowing the hollow inside of the tubular body to communicate with the outside is disposed in such a way that the slit is brought into contact with the surface of the gypsum mold; and the molten metal is poured thereafter onto the surface of the gypsum mold and solidified in such a way that the tubular body is buried in the mold while the slit is exposed on the tire molding surface of the mold. Alternatively, the tubular body having the hollow inside is disposed in such a way that the outer peripheral surface of the tubular body is brought into contact with the surface of the gypsum mold; the molten metal is poured thereafter onto the surface of the gypsum mold and solidified in such a way that the tubular body is buried in the mold while the portion of the outer peripheral surface of the tubular body is exposed on the tire molding surface of the mold; and the slit is formed in the exposed portion of the outer peripheral surface of the tubular body by laser processing. Thus, it is possible to obtain the tire vulcanization mold which includes the tubular body buried in the mold in the solidification of the molten metal and in which the slit formed in the outer peripheral surface of the tubular body is exposed on the tire molding surface of the mold.

In the former manufacturing method, an exhaust mechanism in which the slit is exposed on the tire molding surface of the mold can be almost completed in a casting step of pouring the molten metal onto the surface of the gypsum mold and solidifying the molten metal. In the latter manufacturing method, an exhaust mechanism in which the slit is exposed on the tire molding surface of the mold can be almost completed by performing laser processing of forming the slit after the casting step of pouring and solidifying the molten metal. As described above, in the present invention, the exhaust mechanism can be formed in fewer steps than the conventional techniques.

Moreover, in the exhaust mechanism formed in the present invention, the slit is formed on the outer peripheral surface of the tubular body and communicates with the hollow inside of the tubular body. Thus, the length of the slit (small gap) in the tire radial direction can be made short, the slit having air and gas pass therethrough. Hence, the exhaust mechanism is advantageous in ensuring sufficient exhaust.

BRIEF DESCRIPTION OF THE DRAWINGS

FIG. 6 includes cross-sectional views each showing a modified example of tubular bodies.

DETAILED DESCRIPTION OF EMBODIMENTS

Figure 1:
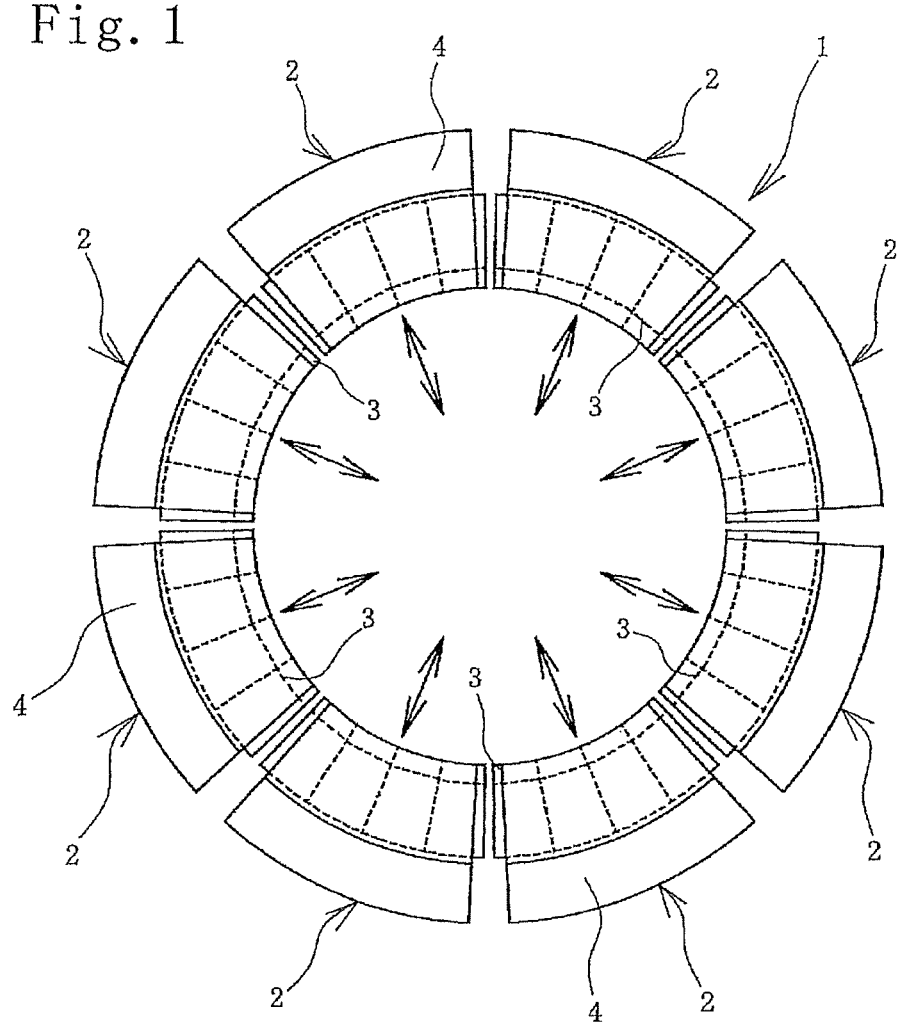
FIG. 1 is a plan view illustrating a tire vulcanization mold of the present invention.

A tire vulcanization mold manufacturing method and a tire vulcanization mold of the present invention are described below based on embodiments shown in the drawings. The arrow C, the arrow R, and the arrow W illustrated in the drawings respectively indicate a circumferential direction, a radial direction, and a width direction of a green tire to be inserted into the vulcanization mold and vulcanized.

Figure 2:
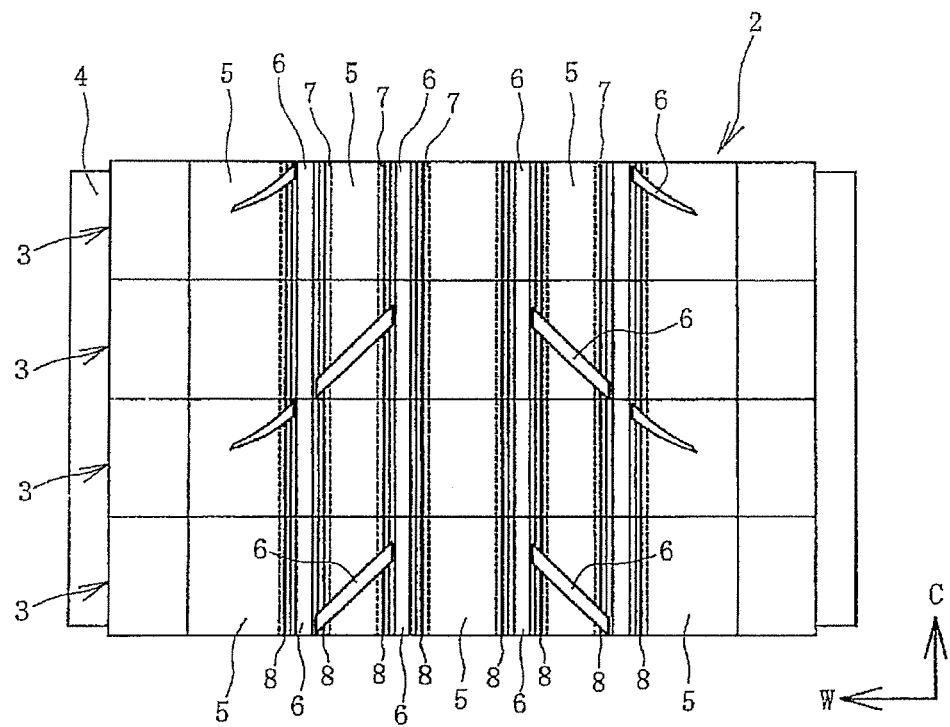
FIG. 2 is a plan view illustrating a sector of FIG. 1.
Figure 3:
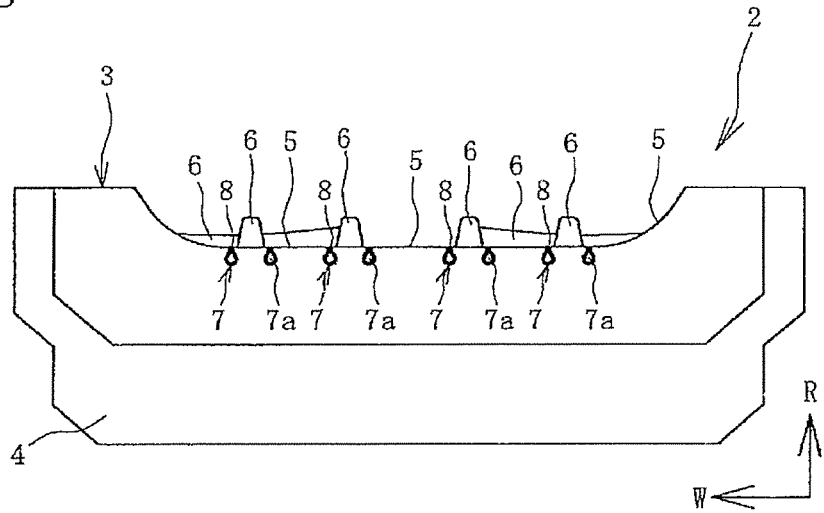
FIG. 3 is a front view of FIG. 2.

As illustrated in FIG. 1, a tire vulcanization mold 1 (hereafter, mold 1) of the present invention is a sectional-type mold formed by assembling multiple sectors 2 in an annular shape. As illustrated in FIG. 2 and FIG. 3, each of the sectors 2 is formed of multiple pieces 3 and a single back block 4, and each adjacent ones of the pieces 3 are attached to the back block 4 in tight contact with each other. A surface of each piece 3 on an inner peripheral side serves as a tire molding surface 5. Groove molding protrusions 6 for forming grooves of the tire are provided as appropriate on the tire molding surface 5.

In the embodiment, four rectangular pieces 3 are fixed to one sector 2 in a plan view. It is only necessary that one sector 2 include multiple pieces 3, and the arrangement of the pieces 3 is not limited to that of the embodiment.

Figure 4:
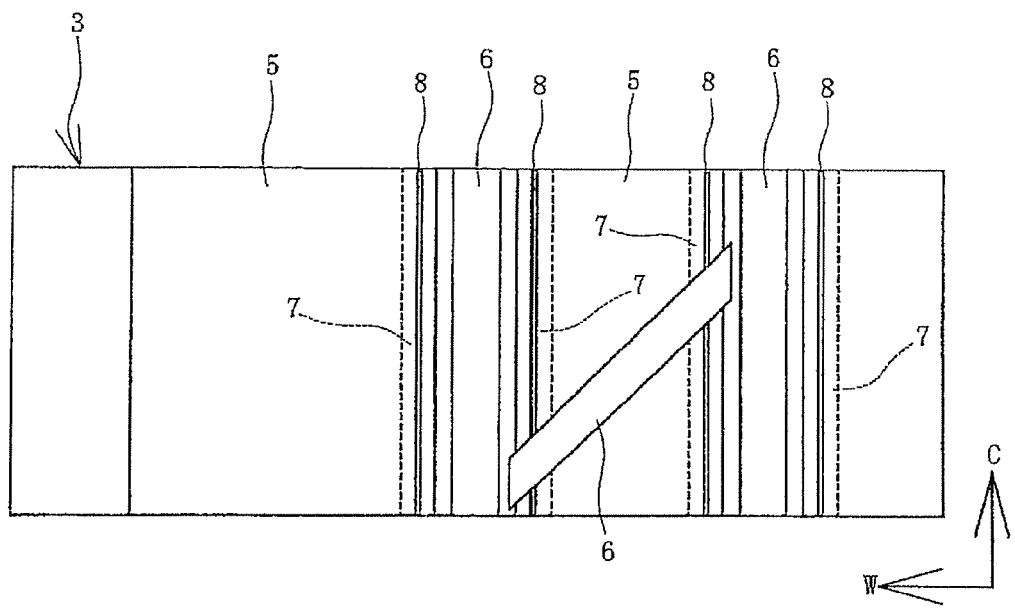
FIG. 4 is a plan view illustrating the left half of a piece in FIG. 3.
Figure 5:
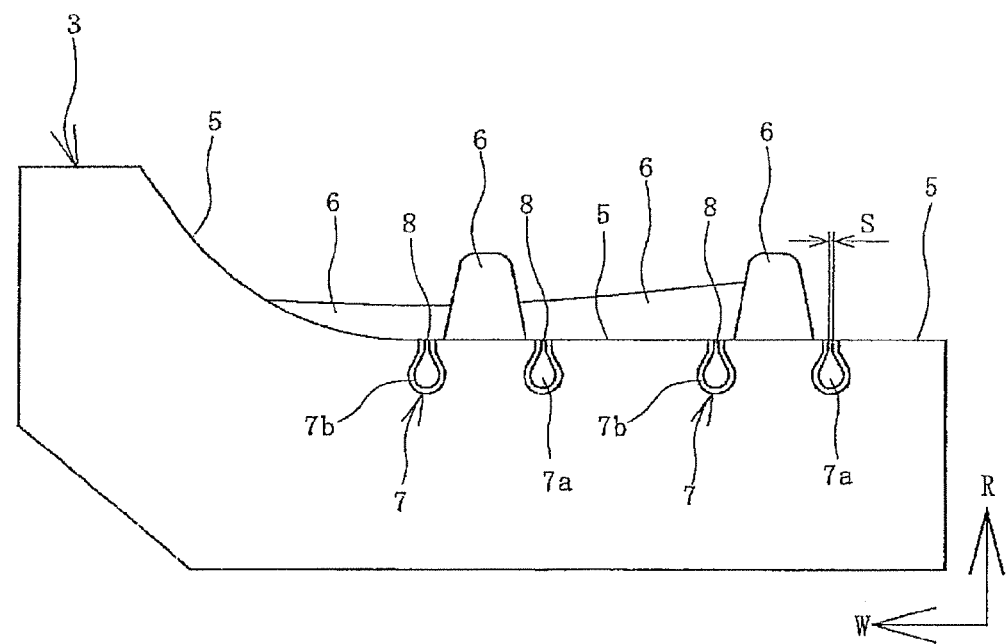
FIG. 5 is a front view of FIG. 4.

Each of the pieces 3 are formed by solidifying molten metal M which is a molten metal material such as aluminum or an aluminum alloy. As illustrated in FIG. 4 and FIG. 5, the piece 3 includes tubular bodies 7 which are buried when the molten metal M is solidified. Each of the tubular bodies 7 extends from one end surface of the piece 3 to the other end thereof, and the tubular body 7 is opened at opposite ends which are respectively disposed in opposite end surfaces of the piece 3 in the tire circumferential direction.

A metal material having a higher melting point than that of the molten metal M is used for the tubular bodies 7. For example, if the molten metal M is aluminum, the tubular bodies 7 made of steel such as stainless steel is used.

Each of the tubular bodies 7 has a shape in which a slit 8 is formed in one end portion of the tubular body 7 by folding a thin plate to cause portions of the thin plate to overlap each other in such a way that a small gap S is provided between the overlapping portions of the thin plate while an elliptical hollow interior 7a is provided in the other end portion thereof. Each of the slits 8 causing the hollow inside 7a to communicate with the outside is formed in an outer peripheral surface of the corresponding one of the tubular bodies 7 along an entire length of the tubular body 7 in the longitudinal direction (tire circumferential direction), and is exposed on the tire molding surface 5 of the piece 3. The small gap S of each slit 8 is about 0.01 mm to about 0.10 mm, preferably about 0.04 mm.

When the green tire is vulcanized, air and gas are exhausted to the hollow inside 7a through the slit 8 and then exhausted to the outside of the mold 1 along end surfaces of the sector 2 and the like. In the present invention, the length, in the tire radial direction, of each slit 8 (small gap S) through which the gas and air pass can be made shorter. The length of each slit 8 in the tire radial direction is set to about 1 mm to about 5 mm, more preferably about 2 mm. The air and gas having passed through each slit 8 are exhausted to corresponding one of the hollow insides 7a which is far larger than the slit 8. Thus, a sufficient exhaust can be ensured. Moreover, the hollow insides 7a respectively of the tubular bodies 7 which are adjacent to each other and which are exposed on the end surface of the piece 3 in the tire circumferential direction can be connected to each other by using an exhaust groove formed separately in the end surface of the piece 3 in the tire circumferential direction. This allows the exhaust efficiency to be further improved.

The slits 8 are provided respectively at positions where the gas and air are likely to accumulate in the vulcanization of the green tire. For example, the tubular bodies 7 are buried in the piece 3 (mold 1) in such a manner that the slits 8 are disposed near base portions of the groove molding protrusions 6.

The slits 8 are only required to be provided at positions where exhausting is necessary. Thus, there are the case where the slits 8 are provided by burying the tubular bodies 7 in all of the pieces 3 forming the mold 1 and the case where the slits 8 are provided by burying the tubular bodies 7 only in certain ones of the pieces 3.

Figure 6A:
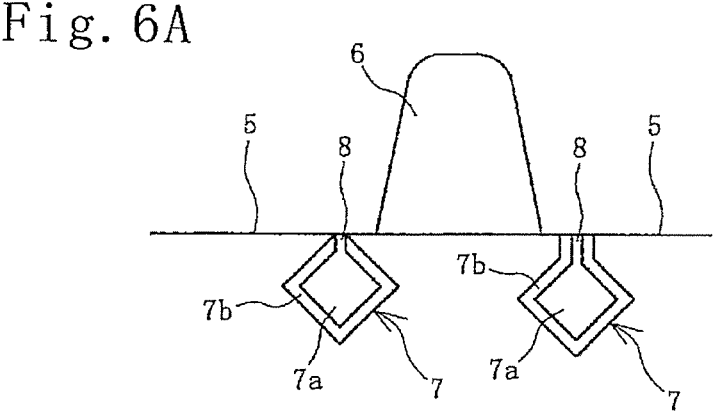
FIG. 6A shows tubular bodies with a triangular horizontal cross section.
Figure 6B:
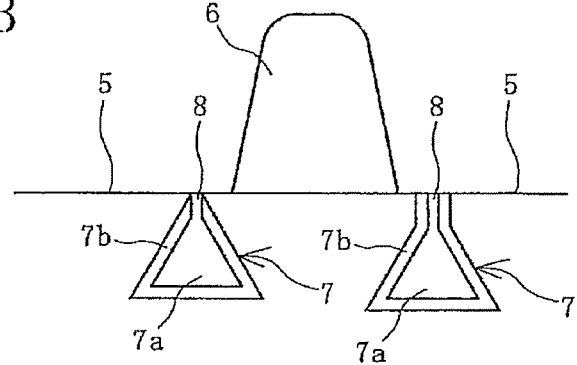
FIG. 6B shows tubular bodies with a square horizontal cross section.

The shape of the tubular bodies 7 is not limited to a cylindrical shape. Instead, it is possible to employ cylindrical bodies 7 whose horizontal cross-sectional shape is a square as illustrated in FIG. 6A, cylindrical bodies 7 whose horizontal cross-sectional shape is a triangle as illustrated in FIG. 6B, or cylindrical bodies 7 whose horizontal cross-sectional shape is another polygonal shape. The width of the hollow inside 7a of each tubular body 7 is set to be, for example, 20 times larger than the small gap of the slit 8 or more to make it easier to ensure sufficient exhaust. The size of the hollow inside 7a of each tubular body 7 is, for example, about 0.5 mm to 5.0 mm in inner diameter.

A process of manufacturing each of the pieces 3 is as follows.

Figure 7:
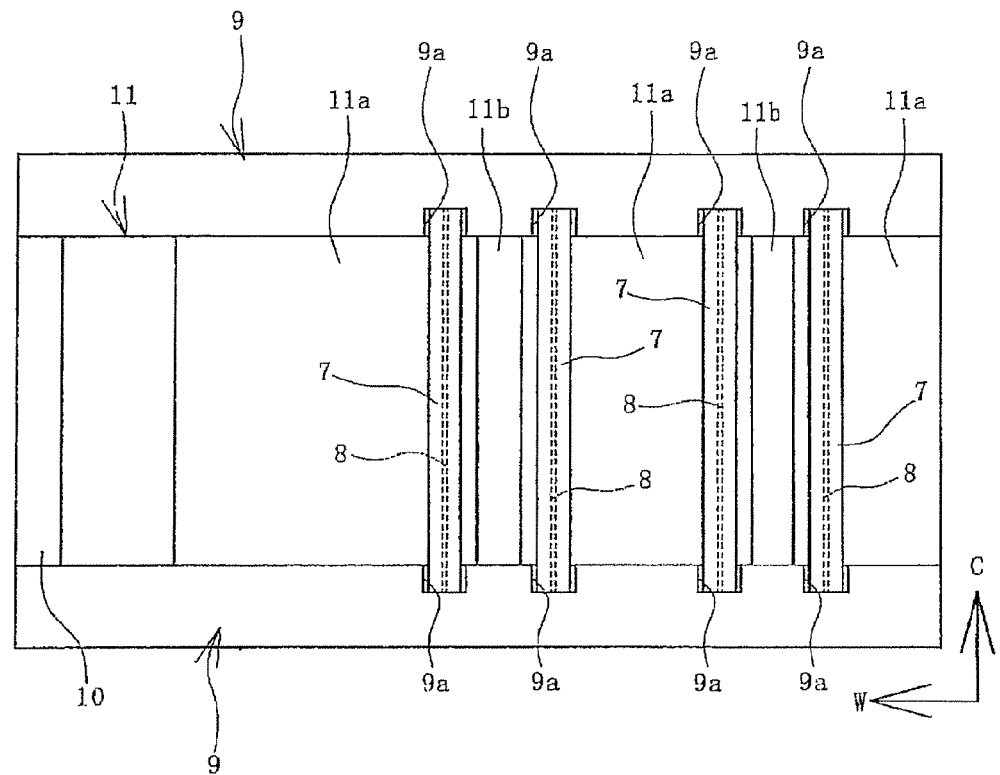
FIG. 7 is a plan view illustrating a step of pouring molten metal onto a surface of a gypsum mold in which tubular bodies having slits are disposed, in the left half of the gypsum mold.
Figure 8:
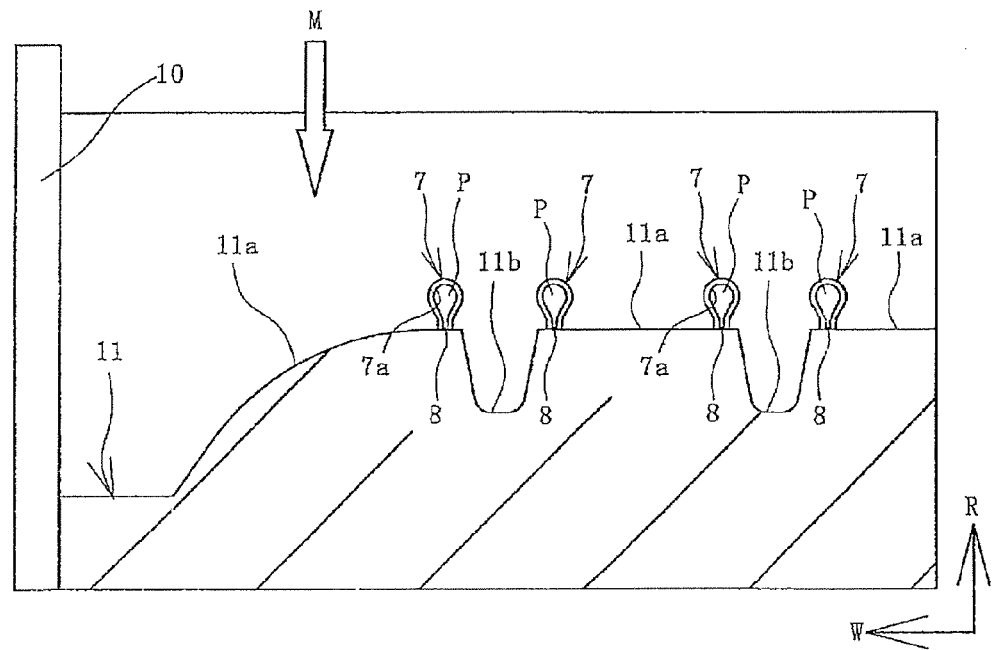
FIG. 8 is an explanatory view illustrating the step of FIG. 7 in a front view.

As illustrated in FIG. 7 and FIG. 8, the tubular bodies 7 are disposed in such a way that the slits 8 are brought into contact with a surface 11a of a gypsum mold 11. The surface 11a of the gypsum mold 11 corresponds to the tire molding surface 5 of the piece 3, and recess portions 11b of the gypsum mold 11 correspond respectively to the groove molding protrusions 6 of the piece 3. The surface 11a of the gypsum mold 11 has an arc shape in the tire circumferential direction. Thus, the tubular bodies 7 are preferably curved in an arc shape along the arc-shaped surface 11a of the gypsum mold 11. When the length of one gypsum mold 11 is short in the tire circumferential direction and the surface 11a is almost flat in the tire circumferential direction, the tubular bodies 7 with a linear shape can be used.

In the embodiment, tubular body holding members 9 provided with holding grooves 9a are disposed respectively in opposite end portions of the gypsum mold 11 in the tire circumferential direction. Frame members 10 are disposed respectively in opposite end portions of the gypsum mold 11 in the tire width direction. Four side surfaces of the gypsum mold 11 are surrounded by the tubular body holding members 9 and the frame members 10.

Then, opposite end portions of each tubular body 7 is fitted respectively to corresponding ones of the holding grooves 9a, and thus the tubular body 7 is disposed in such a way that the slit 8 thereof is brought into contact with the surface 11a of the gypsum mold 11. Using such tubular body holding members 9 allows the tubular bodies 7 to be disposed accurately and stably at respective predetermined positions in the gypsum mold 11. Moreover, the small gap of each slit 8 can be adjusted by adjusting the width of corresponding one of the holding grooves 9a of the tubular body holding members 9.

It is preferable that the hollow insides 7a of the tubular bodies 7 are filled with an easily-collapsible fire-resistant material P. Since the openings at opposite ends of each tubular body 7 is closed by the tubular body holding members 9, the hollow insides 7a can be filled with the easily-collapsible fire-resistant material P without a leak.

The easily-collapsible fire-resistant material P is a material which has a fire resistant property and which easily dissolves into a fluid such as water or easily collapses by applying an impact thereto. Gypsum can be given as an example of the easily-collapsible fire-resistant material P.

Next, the molten metal M is poured onto the surface 11a of the gypsum mold 11 and the molten metal M is solidified. Thus, the piece 3 to which the surface 11a of the gypsum mold 11 is transferred is manufactured. Since the tubular bodies 7 are disposed in such a way that the slits 8 are brought into contact with the surface 11a of the gypsum mold 11, the tubular bodies 7 are buried in the piece 3 while the slits 8 are exposed on the tire molding surface 5 of the piece 3. Portions of the tubular bodies 7 protruding from the piece 3 are cut off.

Next, the easily-collapsible fire-resistant material P filling the hollow insides 7a of the tubular bodies 7 is removed. The easily-collapsible fire-resistant material P can be removed from the hollow insides 7a by spraying water on the easily-collapsible fire-resistant material P or by pushing the easily-collapsible fire-resistant material P with a rod-shaped body.

Since the molten metal M is poured onto the surface 11a of the gypsum mold 11 with the hollow insides 7a previously filled with the easily-collapsible fire-resistant material P, the molten metal M is surely prevented from entering the hollow insides 7a and the small gaps S of the slits 8. Thus, the molten metal M is not solidified in the hollow insides 7a and the slits 8. Hence, there is no need to remove solidified metal material.

When there is no possibility of the molten metal M entering the hollow insides 7 and the slits 8 of the tubular bodies 7, the molten metal M can be poured onto the surface 11a of the gypsum mold 11 without filling the hollow insides 7a of the tubular bodies 7.

As described above, an exhaust mechanism in which the slits 8 are exposed on the tire molding surface 5 of the piece 3 forming the mold 1 can be substantially completed in the casting step of pouring the molten metal M onto the surface 11a of the gypsum mold 11 and solidifying the molten metal M. The exhaust mechanism capable of ensuring sufficient exhaust can be obtained in a short time without performing more processing steps than the conventional techniques.

Figure 9:
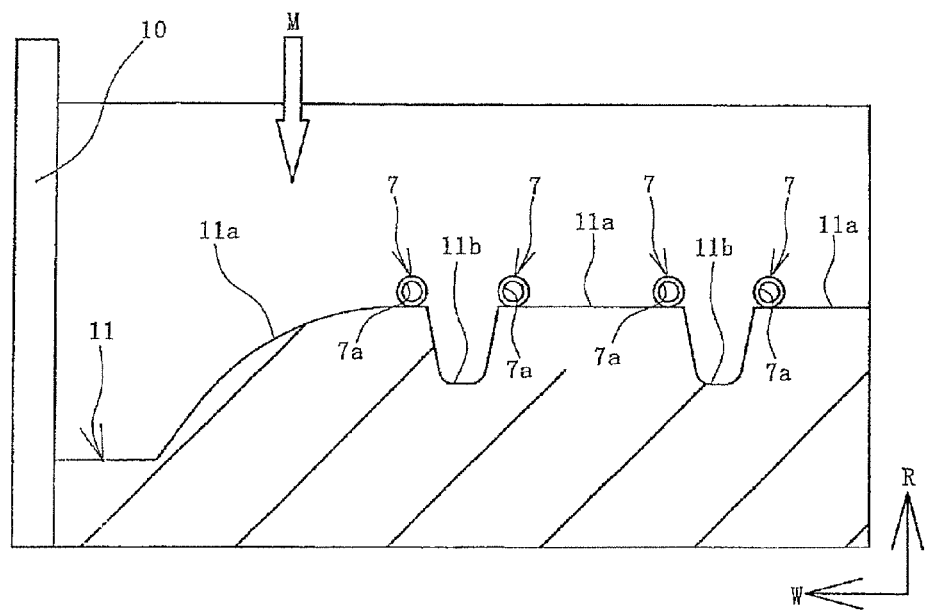
FIG. 9 is an explanatory view showing, in a front view, a step of pouring molten metal onto a surface of a gypsum mold in which tubular bodies with no slits are disposed.
Figure 10:
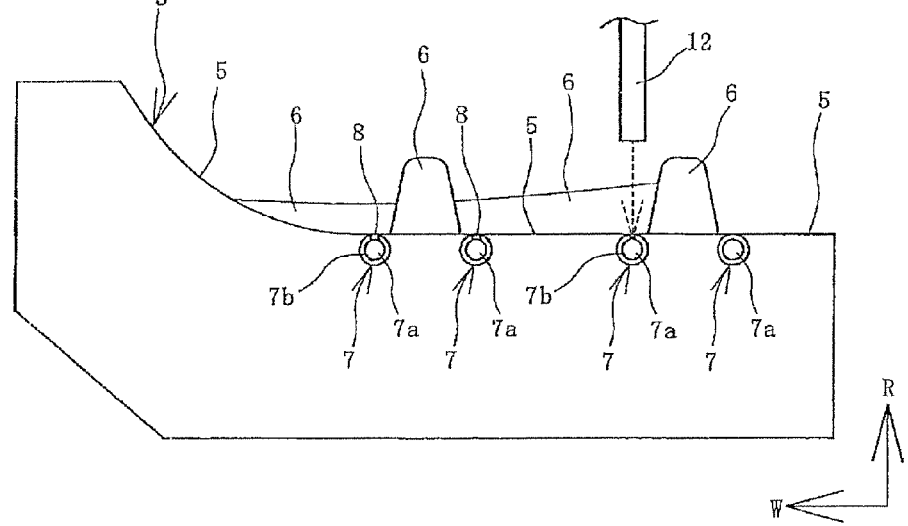
FIG. 10 is an explanatory view showing, in a front view, a step of forming slits in a portion of an outer peripheral surface of each tubular body by laser processing, the portion being exposed on the tire formation surface.

Another embodiment of manufacturing a piece 3 is illustrated in FIG. 9 and FIG. 10. The embodiment is largely different from the previous embodiment in that tubular bodies 7 without slits 8 are used.

As illustrated in FIG. 9, the tubular bodies 7 are disposed in such a way that outer peripheral surfaces thereof are brought into contact with a surface 11a of a gypsum mold 11. It is preferable that the tubular bodies 7 are curved in an arc shape along the surface 11a of the gypsum mold 11 which has an arc shape in the tire circumferential direction.

As in the previous embodiment, the tubular bodies 7 are preferably disposed in such a way that the outer peripheral surfaces thereof are brought into contact with the surface 11a of the gypsum mold 11, by fitting opposite end portions of each tubular body 7 to corresponding ones of holding grooves 9a of tubular body holding members 9 disposed respectively at opposite end portions of the gypsum mold 11 in the tire circumferential direction.

Next, as in the previous embodiment, molten metal M is poured onto the surface 11a of the gypsum mold 11 and the molten metal M is solidified. Thus, the piece 3 to which the surface 11a of the gypsum mold 11 is transferred is manufactured. Since the tubular bodies 7 are disposed in such a way that the outer peripheral surfaces thereof are brought into contact with the surface 11a of the gypsum mold 11, each tubular body 7 is buried in the piece 3 while a portion of the outer peripheral surface of the tubular body 7 is exposed on a tire molding surface 5 of the piece 3. Portions of the tubular bodies 7 protruding from the piece 3 are cut off.

Subsequently, as illustrated in FIG. 10, the portion of the outer peripheral surface of each tubular body 7 which is exposed on the tire molding surface 5 of the piece 3 is irradiated with a laser beam emitted from a laser processing machine 12 to form a slit 8 penetrating a peripheral wall 7b of the tubular body 7. The specifications of the slit 8 are the same as those of the previous embodiment.

In the embodiment, an exhaust mechanism in which the slits 8 are exposed on the tire molding surface 5 of the piece 3 forming the mold 1 can be substantially completed by performing laser processing of forming the slit 8 in each tubular body 7 after the casting step of pouring the molten metal M onto the surface 11a of the gypsum mold 11 and solidifying the molten metal M. The exhaust mechanism capable of ensuring sufficient exhaust can be obtained in a short time without performing more processing steps than the conventional techniques.

The invention claimed is:

1. A tire vulcanization mold manufacturing method of manufacturing a tire vulcanization mold onto which a surface of a gypsum mold is transferred, the tire vulcanization mold manufacturing method comprising:
    positioning at least one tubular body having a slit through which a hollow interior of the tubular body communicates with an outside such that a portion of the tubular body defining the slit contacts the surface of the gypsum mold, the tubular body extending longitudinally along the surface of the gypsum mold so that the slit that extends along the tubular body is exposed;
    providing molten metal onto the surface of the gypsum mold in such a way that the tubular body is buried in the molten metal while the slit remains exposed from the molten metal; and
    solidifying the molten metal to form the tire vulcanization mold such that the slit remains exposed at a tire molding surface of the tire vulcanization mold.

2. The tire vulcanization mold manufacturing method according to claim 1, further comprising
    providing a collapsible fire-resistant material in the hollow interior of the tubular body before performing the positioning of the tubular body; and
    removing the collapsible fire-resistant material from the hollow interior inside of the tubular body after the solidifying of the molten metal.

3. The tire vulcanization mold manufacturing method according to claim 1, wherein
    the positioning positions the tubular body proximate to a recess portion in the gypsum mold.

4. The tire vulcanization mold manufacturing method according to claim 1, wherein
    the positioning positions a plurality of tubular bodies, each having a respective slit through which the hollow interior of the tubular body communicates with an outside such that a respective portion of each of the tubular bodies defining the slit contacts the surface of the gypsum mold;
    the providing of the molten metal buries each of the tubular bodies in the molten metal while the slits remain exposed from the molten metal; and
    the solidifying forms the tire vulcanization mold such that each of the slits is exposed at the tire molding surface of the tire vulcanization mold.

5. The tire vulcanization mold manufacturing method according to claim 4, wherein
    the positioning positions the plurality of the tubular bodies on opposite sides of a recess portion in the gypsum mold.

6. The tire vulcanization mold manufacturing method according to claim 4, further comprising
    positioning tubular body holding members at opposite end portions of the gypsum mold, each of the tubular body holding members including a respective groove; and
    the positioning of the tubular bodies includes positioning each of the tubular bodies into a respective pair of the grooves such that the portion of each of the tubular bodies defining the slit is brought into contact with the surface of the gypsum mold.

7. A tire vulcanization mold manufacturing method of manufacturing a tire vulcanization mold onto which a surface of a gypsum mold is transferred, the tire vulcanization mold manufacturing method comprising:
    positioning at least one tubular body having a slit through which a hollow interior of the tubular body communicates with an outside such that a portion of the tubular body defining the slit contacts the surface of the gypsum mold;
    providing molten metal onto the surface of the gypsum mold in such a way that the tubular body is buried in the molten metal while the slit remains exposed from the molten metal;
    solidifying the molten metal to form the tire vulcanization mold such that the slit is exposed at a tire molding surface of the tire vulcanization mold; and
    positioning tubular body holding members at opposite end portions of the gypsum mold, each of the tubular body holding members including a respective groove, the positioning of the tubular body including positioning the tubular body into the grooves such that the portion of the tubular body defining the slit is brought into contact with the surface of the gypsum mold.

8. The tire vulcanization mold manufacturing method according to claim 7, further comprising
    providing a collapsible fire-resistant material in the hollow interior of the tubular body before performing the positioning of the tubular body; and
    removing the collapsible fire-resistant material from the hollow interior inside of the tubular body after the solidifying of the molten metal.

9. A tire vulcanization mold formed by solidifying molten metal, the tire vulcanization mold comprising a tubular body that becomes buried in the mold during the solidifying of the molten metal such that a slit formed in an outer peripheral surface of the tubular body is exposed on a tire molding surface of the mold.

10. The tire vulcanization mold according to claim 9, wherein the slit extends longitudinally along the outer peripheral surface of the tubular body.

11. A tire vulcanization mold manufacturing method of manufacturing a tire vulcanization mold onto which a surface of a gypsum mold is transferred, the tire vulcanization mold manufacturing method comprising:
    positioning at least one tubular body having a hollow interior such that an outer peripheral surface of the tubular body contacts the surface of the gypsum mold;
    providing molten metal onto the surface of the gypsum mold in such a way that the tubular body is buried in the molten metal while a portion of the outer peripheral surface of the tubular body remains exposed from the molten metal;

solidifying the molten metal to form the tire vulcanization mold such that the portion of the outer peripheral surface of the tubular body remains exposed from the molten metal; and forming a slit in the exposed portion of the outer peripheral surface of the tubular body.

12. The tire vulcanization mold manufacturing method according to claim 11, further comprising positioning tubular body holding members at opposite end portions of the gypsum mold, each of the tubular body holding members including a respective groove; and the positioning of the tubular body includes positioning the tubular body into the grooves such that the outer peripheral surface of the tubular body is brought into contact with the surface of the gypsum mold.

13. The tire vulcanization mold manufacturing method according to claim 11, wherein the forming of the slit includes irradiating the exposed portion with laser light to form the slit in the exposed portion of the outer peripheral surface of the tubular body.

14. The tire vulcanization mold manufacturing method according to claim 12, wherein the forming of the slit includes irradiating the exposed portion with laser light to form the slit in the exposed portion of the outer peripheral surface of the tubular body.

15. The tire vulcanization mold manufacturing method according to claim 11, wherein the forming of the slit is performed after the solidifying of the molten metal to form the tire vulcanization mold.

16. The tire vulcanization mold manufacturing method according to claim 12, wherein the forming of the slit is performed after the solidifying of the molten metal to form the tire vulcanization mold.

17. The tire vulcanization mold manufacturing method according to claim 12, wherein the forming of the slit is performed after the solidifying of the molten metal to form the tire vulcanization mold.

18. The tire vulcanization mold manufacturing method according to claim 11, wherein the positioning positions a plurality of tubular bodies such that a respective outer peripheral surface of each of the tubular bodies contacts the surface of the gypsum mold; and the providing of the molten metal buries each of the tubular bodies in the molten metal while the respective outer peripheral surfaces remain exposed from the molten metal.

19. The tire vulcanization mold manufacturing method according to claim 18, wherein the positioning positions the plurality of the tubular bodies on opposite sides of a recess portion in the gypsum mold.

20. The tire vulcanization mold manufacturing method according to claim 15, wherein the positioning positions a plurality of tubular bodies such that a respective outer peripheral surface of each of the tubular bodies contacts the surface of the gypsum mold;

the providing of the molten metal buries each of the tubular bodies in the molten metal while the respective outer peripheral surfaces remain exposed from the molten metal; and the solidifying forms the tire vulcanization mold such that each of the respective outer peripheral surfaces is exposed at a tire molding surface of the tire vulcanization mold.

21. The tire vulcanization mold manufacturing method according to claim 11, wherein the positioning positions the tubular body proximate to a recess portion in the gypsum mold.

* * * * *